United States Patent
Learned et al.

(10) Patent No.: US 7,724,851 B2
(45) Date of Patent: May 25, 2010

(54) RECEIVER WITH MULTIPLE COLLECTORS IN A MULTIPLE USER DETECTION SYSTEM

(75) Inventors: Rachel E. Learned, Waltham, MA (US); Matthew A. Taylor, Weare, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1410 days.

(21) Appl. No.: 11/057,479

(22) Filed: Feb. 14, 2005

(65) Prior Publication Data
US 2005/0195790 A1 Sep. 8, 2005

Related U.S. Application Data

(60) Provisional application No. 60/550,110, filed on Mar. 4, 2004.

(51) Int. Cl.
*H04L 1/06* (2006.01)
(52) U.S. Cl. ........................ 375/347; 455/303
(58) Field of Classification Search ............... 375/260, 375/316, 340, 347; 455/303
See application file for complete search history.

(56) References Cited

U.S. PATENT DOCUMENTS

| | | | | |
|---|---|---|---|---|
| 6,141,393 A * | 10/2000 | Thomas et al. | ............... | 375/347 |
| 6,618,433 B1 * | 9/2003 | Yellin | ..................... | 375/148 |
| 7,092,452 B2 * | 8/2006 | Taylor et al. | ............... | 375/267 |
| 2003/0076875 A1 * | 4/2003 | Oates | ..................... | 375/147 |
| 2003/0198305 A1 * | 10/2003 | Taylor et al. | ............... | 375/341 |
| 2003/0206577 A1 * | 11/2003 | Liberti et al. | ............... | 375/152 |
| 2003/0236081 A1 * | 12/2003 | Braun | ..................... | 455/273 |
| 2004/0101034 A1 * | 5/2004 | Ben-David et al. | ......... | 375/148 |
| 2005/0094713 A1 * | 5/2005 | Yellin | ..................... | 375/148 |

* cited by examiner

*Primary Examiner*—Shuwang Liu
*Assistant Examiner*—David Huang
(74) *Attorney, Agent, or Firm*—Malin, Haley & DiMaggio; Barry Haley; Daniel J. Long

(57) ABSTRACT

A digital wireless communication system for increasing the number of users capable of communicating over a network permits multiusers to transmit information simultaneously on the same channel of frequency. The primary example of such a system would be that employing radio frequency transmissions, even optical transmissions; however, the invention will also apply to magnectic detections such as in the reading of information stored on a magnetic tape. It is possible to increase overall throughput in terms of total number of bits transmitted through the shared medium by all users of a multiple access system if the signals are allowed to interfere. The present invention provides a multiuser detection process and apparatus that is capable of pulling apart signals in heavy interference in real time by combining the signals received from two or more spatially seperated collectors or antennas. The present invention includes the step of taking more measurements of the received signal from two separate collections prior to definition of the multiuser algorithm parameters and combining the different collection of signals as one signal for multiple user detection processing.

11 Claims, 2 Drawing Sheets

RECEIVER WITH MULTIPLE COLLECTORS IN A MULTIPLE USER DETECTION SYSTEM

CROSS REFERENCE TO RELATED APPLICATION

This application claims rights under 15 U.S.C. 119(e) from U.S. application Ser. No. 60/550,110 filed Mar. 4, 2004, the contents of which are incorporated herein by reference.

BACKGROUND OF THE INVENTION

1. Field of Invention

This invention relates to digital communications (either traditional wireless communications or the reading of digitally stored information from an optical or magnetic media) for increasing the throughput of transmitted bits in a multiuser detection (MUD) based multiple access communication system in which multiple users transmit information simultaneously on the same channel or frequency, causing purposeful interference, by employing multiuser detection algorithms in each receiver where each receiver also employs multiple collectors.

2. Description of Related Art

Multiple access communication systems allow the transmission of multiple digital data streams between multiple transmitting and receiving devices. Cellular or PCS systems provide high quality voice service in a wide-ranging geographical coverage area at relatively low cost. However, since many users transmit energy on the same communications channel, a number of inherent difficulties arise, particularly when a large number of user receivers attempt to detect the information associated with a particular user when there is heavy signal interference created by other users of the system at the same time. Typically the signal of interest cannot be received or the quality of reception is significantly degraded.

One way of solving this problem is to separate the interfering transmissions at the receiver, using signal processing techniques. However, today's current state of the art receivers are not capable of detecting and decoding the information associated with each user under conditions of heavy interference. Another solution to the co-channel interference problem is to decrease the number of users per channel. This, of course, is not an attractive option for telecommunication companies, since obtaining the maximum number of users or managing peak volume transmission periods are important business objectives.

Several techniques exist to improve results in co-channel multiple access communications systems. Frequency-Division Multiple Access (FDMA) assigns a different frequency to each user. In a cellular telephone configuration this poses problems because all proximate cells must operate on different frequencies. However, frequency bands may be re-used, provided that the same frequency cells are positioned at a certain distance apart. A further drawback with FDMA schemes is that users will pay full-time for their assigned frequency regardless of their actual use of the system. Additionally, the number of users will be restricted to the number of dedicated frequencies that can be provided and one modem is required for each user therefore leading to high hardware and operational costs.

In Time Division Multiple Access (TDMA) technology, multiple channels of data are temporally interleaved, i.e. each signal is assigned to a different time interval and the signals are transmitted individually, according to their assigned time slot. However, in a TDMA system, all transmitters and receivers must have access to a common clock, as time-synchronization among the users is required. Also, as for FDMA, there is only a limited number of time slots available for assignment which can cause a system to be fully loaded even when there are many tens of users requesting a channel.

Code Division Multiple Access (CDMA) is another multiplexing technique wherein for each communication channel, the signals are encoded using a sequence known to the transmitter and the receiver for that specific channel. In CDMA, all users use the same frequency at the same time. However, before transmission, the signal from each user is multiplied by a distinct signature waveform. The signature waveform is a signal that has a larger bandwidth than the information-bearing signal from the user. However, in a CDMA system, the total level of co-channel interference limits the number of active users at any instant of time. The present invention involves improvements made to techniques of multi-access system reception to solve practical problems associated with increasing the number of simultaneous users for any actual commercial system that employs algorithm signaling such as TDMA, FDMA or a hybrid of the two.

It is possible to increase overall throughput in terms of total number of bits transmitted through the shared medium, by all users of a multiple access system if the signals are allowed to interfere. Current state of the art receivers, however, are not capable of detecting and decoding the information associated with each user when there is heavy interference.

Multiuser detection systems take full advantage of all knowledge available at the receiver, by making use of any knowledge that the receiver has about the interference signals. The ability of multiuser detection procedures to perform the required processing in real time to produce reliable symbol estimates is a known drawback of multiuser detection based systems. This is due to the fact that as the total number of interfering signals goes up, the non-optimal MUD algorithms that perform short cuts in detection and estimation of symbols relative to the maximum likelihood exhaustive search MUD algorithm begin to fail. Moreover, as the number of users is increased beyond the number of dimensions (independent receiver measurements) the algorithm mathematics become ill defined and cannot be computed.

Therefore a need exists to overcome the problems with the prior art as discussed above, and particularly for a system and method for increasing the throughput of transmitted bits in a multiuser detection (MUD) based multiple access communication systems in which multiple users transmit information simultaneously on the same channel or frequency by employing multiple collectors at the receiver.

SUMMARY OF THE INVENTION

The present invention comprises a method and system for increasing the throughput of a multiuser detection-based multiple access digital communications system that transmits signals on the same channel or that have signals that interfere such as with overlapping channels. The number of users that can be packed into a MUD-based multiple access system is a function of the number of independent dimensions over which the set of signals is spread (the dimension of the span of the set of signals). The total number of users can be increased if more independent measurements of the received signal is made prior to the definition of the multiuser detection algorithm parameters for the purposes of MUD processing. In some cases, only a very small separation of collectors is sufficient to offer a higher dimensional space over which the set of interfering signals is defined.

The method of the invention comprises the steps of taking more measurements of the received signal, prior to definition of the multiuser algorithm parameters. The different collection of signals is carefully combined as one multidimensional signal for the purpose of MUD processing. Specifically the effective dimension of the new set of user received waveforms must be greater than the rank of the original set prior to the multiple collection combining in order to achieve the benefits of the invention.

The method includes utilizing a receiver having two or more collectors in which a user device, such as a cell phone handset with an antenna, would include a second antenna, added to the handset. The method includes providing for two simultaneous collections of the signal by one user. Each collected signal is time stamped along with carefully merging of one or more collected signals to combine the signals into one effective multidimensional signal prior to processing in the multiple user detection process of choice. The signal model is expanded to include several S matrices, one stacked upon the other, where each S matrix is each due to a different collection site at the receiver, wherein the rank of the new aggregate signal matrix is much higher than the rank of any of the individual S matrices. Stacking one or more S matrices from different sources provides the new rank, which is significantly increased, allowing for even the simplest of non-optimal MUD algorithms to work well.

In using the invention in a wireless communication application, a plurality of users having transceivers will transmit on the same channel or with signals that interfere with overlapping channels. A single base station would receive each signal propagated by each user. The invention uses any number of multiuser detector (MUD) processing procedures on the aggregate received signal, with pre-processing from some parameter estimation procedure as necessary to determine the number of interfering users, their timing offsets, frequency offsets, etc. Using the present invention, two simultaneous collections are made of the received signal which is comprised of several signals added together, one from each of the simultaneously transmitting users. This means that two separate antennas or collectors would be maintained at the single base station receiver, which would then permit two simultaneous collections of the signal. Each collected signal at the base station would be time stamped before the signals are sent off to the MUD processing of choice; however, the two collectors need not be calibrated in any way. Moreover, the two collectors must not be processed together to create any sort of beam and must simply be treated as separate measurements for the collection step.

When viewing the present invention, it is very instructive to see what a current receiver looks like, prior to the improvement of this invention. Typically the conventional receiver has a single collector (antenna) that collects the received signal or a set of antenna elements that collect the signal after having been formed into a beam via conventional beamforming processing techniques. Either way, the collected signal is sent through a state of the art processor that includes front end filters to get rid of signals outside of the frequency band of interest band and down converters and an analog to digital converter. The processor outputs a sample discrete time signal to a parameter estimation device. This signal would be a summation of many signals, one for each transmitter involved. In the multiuser detection based multiple access system, the transmissions are purposely made to interfere, hence the signals might all be on the same channel, in the same time slot or frequency band. The signal is sent to the parameter estimation unit that calculates, from the signal using known training sequences or pilot tones, several parameters including for each user 1) a time stamp, 2) a symbol timing offset relative to some internal clock, 3) carrier phase offset relative to the internal oscillator at the receiver frequency, 4) any frequency offset or Doppler and 5) multipath structure of the channel. In essence the parameter estimation unit gives the impulse response of the channel associated with each user. These parameters are then passed along to a conventional multiuser detection unit. The received signal is also passed to the MUD processing unit. At this point the multiple user detection unit uses the parameter estimation signals to finalize the construction of the MUD procedure that must be implemented to retrieve from the aggregate received signal, symbol streams associated with each user. The set of symbol streams, one for each user, is then the output.

With the present invention, multiple collectors (two or more) are used in the signal receiver at the base station. The collectors are identical to those used with a single collector in the prior art with the exception that each multiple collector includes its own parameter estimation unit. The outputs of all of the individual collectors and its parameter estimation unit are sent to an organizational unit that uses the signal time stamp information to stack digitally received signals into a vector measurement at each time sample. The organization unit combines the individual separate sets of the parameter estimates into one combined set that is then sent to the MUD unit. The result is that the total number of users packed into a given channel can be increased using the present invention.

It is an object of the present invention to increase the total number of users packed into a given channel and to increase overall throughput in terms of total number of bits transmitted through a shared medium by all of the users of a multiple access system by providing for two or more collectors in the receiver.

It is another object of the invention to provide for any given multiuser detector that offers good performance in a given interference-ridden scenario by replacing it with a lower complexity multiuser detector that takes short cuts in the detection algorithm by combining signals received from two or more spatially separated receiver ports prior to the MUD processing unit.

Another object of the invention is to increase the number of total users packed into a given channel relative to any currently satisfactory system of interfering users and multiple users, by providing for more measurements to be taken of the received signal, prior to definition of the multiuser detection algorithm parameters and the different collection of signals are carefully combined as one multidimensional signal for purposes of MUD processing.

In yet another object of the invention is to provide a signal model where the model is expanded to include several matrices, one stacked upon another, each due to a different collection site, where the rank of the new signal matrix is much higher, allowing for a very simple MUD algorithms to work well in a multiple user environment.

The invention accordingly comprises the features of construction, combinations of elements and arrangement of parts that will be exemplified in the description set forth hereinafter and the scope of the invention will be indicated in the claims.

DETAILED DESCRIPTION OF THE PREFERRED EMBODIMENT

The present invention provides a multiuser detection process and apparatus that is capable of pulling apart signals in heavy interference. The number of users that can be packed into a MUD-based multiple access system is a function of the number of independent dimensions over which the set of signals is spread (the dimension of the span of the set of signals). The total number of users can be increased if more measurements of the received signal prior to the definition of the multiuser detection algorithm parameters and the different collections of signals are carefully combined as one signal for the purposes of MUD processing. In some cases, only a very small separation of collectors is required.

The invention can offer two improvements. In one scenario, any given multiuser detector known to offer good performance in a given interference-ridden scenario can be replaced by a lower complexity multiuser detector that takes short cuts in the detection algorithm relative to the map, the optimal maximum a posteriori (MAP) or ML exhaustive search algorithm by combining the signal received from two or more spatially separated receiver ports. The second scenario is that the total number of users packed into a given channel can be increased relative to any currently deemed satisfactory system of interfering users and multiuser receivers using the present invention as a receiver.

Figure 1:
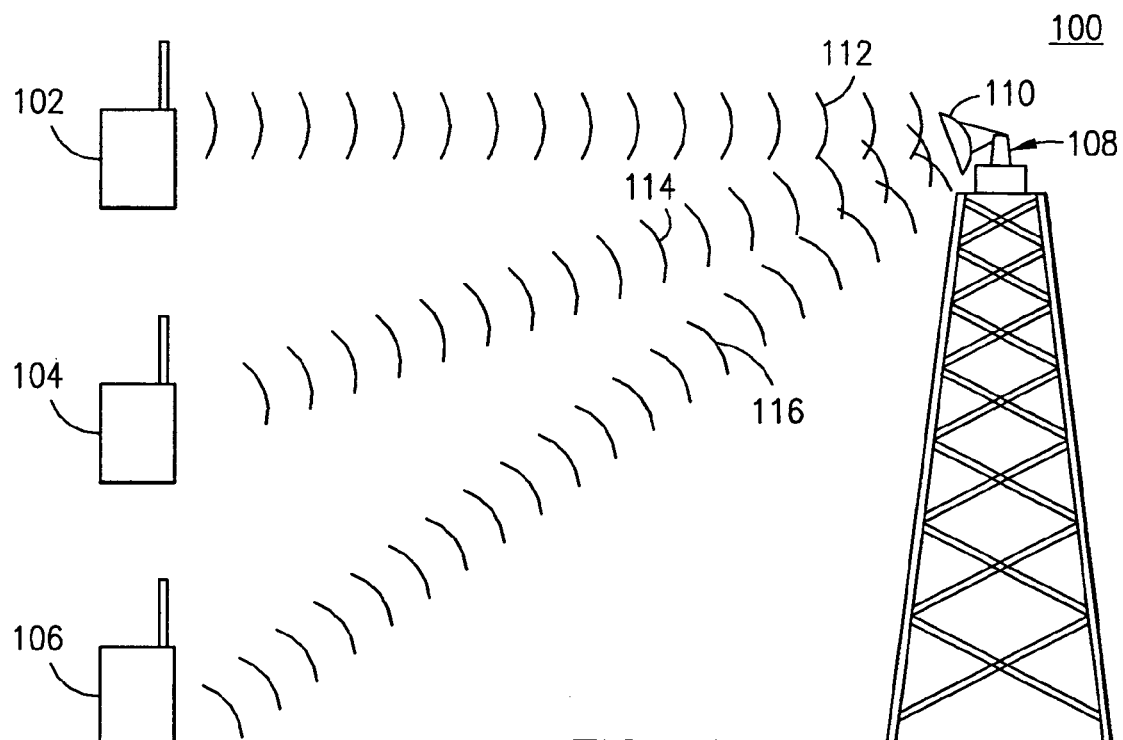
FIG. 1 is an illustration of signal interference that can occur in a multiuser multiple access communication system.
Figure 3:
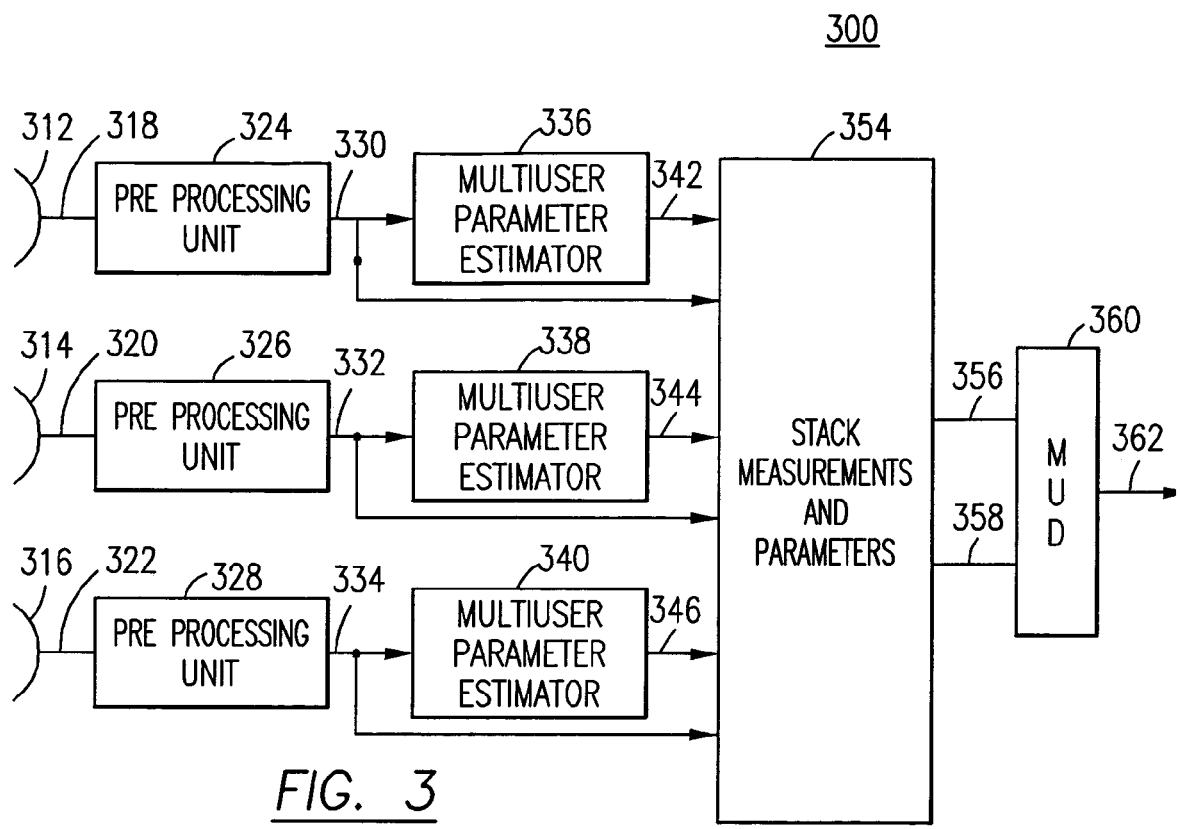
FIG. 3 is an exemplary block diagram illustrating a preferred embodiment of the present invention that uses multiple collectors and components for the MUD processing system.

Referring now to the multiuser multiple access communication system 100 shown in FIG. 1, cell phone units 102, 104 and 106 transmit on the same channel, all with signals that interfere with overlapping channels and the signals transmitted from each of the units. Each signal from units 102, 104 and 106 propagates and is received at collector antenna 110. Conventionally, as shown in the prior art, typically the system would use any number of multiuser detection processing procedures on the aggregate received signal with pre-processing from some parameter estimating procedure as necessary, as contained in the receiver 108 with its signal antenna 110 or collector. However, using the present invention, the receiver 108 would include at least two or more simultaneous collectors in addition to 110 for simultaneous collections of the signals 312, 314, and 316 as depicted in FIG. 3. Using three collectors in accordance with the example shown in this invention, three simultaneous collections are made of the aggregate signal comprised of the signals from units 102, 104 and 106. The procedure in accordance with this invention is not beamforming or spatial nulling prior to sending the signal along for processing.

Figure 2:
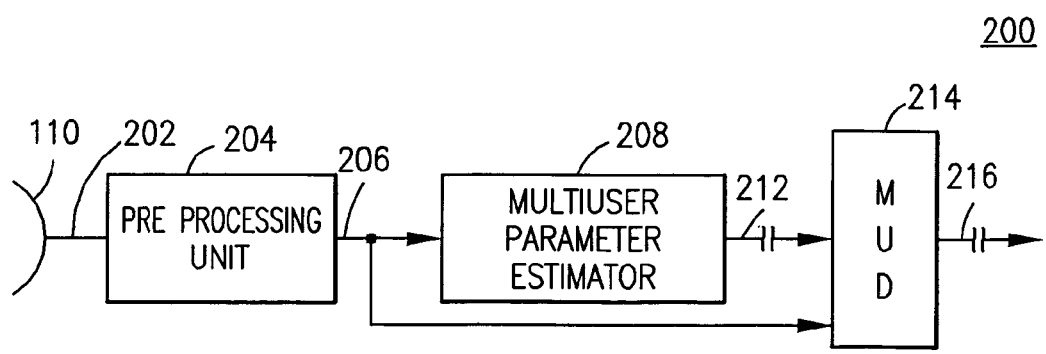
FIG. 2 is a block diagram of a typical MUD receiver used in a multiple access system.

FIG. 2 shows a conventional multiuser, multiple access prior art receiver 200 with a single collector/antenna 110. The typical single collector 110 that collects the signals from units 102, 104 and 106 are received, and passed as an analog radio frequency signal on line 202 and are processed according to typical state of the art receiver front end unit 204 which includes front end filters to get rid of signals outside of the band of interest, down converters, and analog to digital converters. Processor 204 outputs a sampled signal on line 206. This signal is a summation of many downconverted sampled signals, one from each transmitter such as those due to the transmissions from units 102, 104 and 106 representing signals 112, 114, and 116.

In a multiuser detection based, multiple access (MA) system, the transmitted signals from multiple users are purposely made to interfere such that the transmitted signals can all be on the same channel, in the same time slot or frequency band. The signal parameter estimation device (parameter estimator) 208 calculates from input signals, using known training sequences or pilot tones, several parameters including for each user (transmitter), a time stamp, symbol timing offset relative to some internal clock, carrier phase offset relative to the internal oscillator at the receiver, any frequency offset or Doppler and multipath structure of the channel. The parameter estimation device 208 gives the impulse response of the channel associated with each transmitted signal 112, 114, and 116 from each transmitter, 102, 104, and 106, respectively. The function of one option for the parameter estimator 208 is described in detail in U.S. patent application Ser. No. 10/228,787 filed Aug. 26, 2002, the entire teachings of which are hereby incorporated by reference.

The signal parameters are sent along line 212 to the multiuser detection (MUD) processor 214. The MUD processor 214 uses the signal parameter estimates to finalize "definition" of the MUD procedure that must be implemented to extract or retrieve from the aggregate received signal the symbol streams associated with each user. The MUD processor 214 also receives the sample signal 206, output signal from processor 204, and performs the MUD processing on the received signal samples to create an estimate of the symbol stream transmitted by each of the interfering users, 102, 104, 106. The set of symbol streams, one for each user, is the information output at 216.

Using the present invention as shown in FIG. 3, the multiple transmitters/users 102, 104 and 106 shown in FIG. 1 transmit signals 112, 114, and 116 which interfere such that all of the signals could be on the same frequency. However, instead of one single collection of the single aggregate signal comprised of the signals 112, 114, and 116, as shown in FIG. 1, the present invention uses two or more signal collectors/antennas 312, 314 and 316, which are each receiving a slightly different combination of the signals 112, 114, and 116 since each of the transmitted signals passes through a slightly different physical channel associated with each of the different collectors. Each collector, 312, 314, and 316 is followed by a corresponding signal processor 324, 326 and 328 at one receiver base station 300. Each collected signal at each collector 312, 314 and 316 is time stamped in each preprocessing unit 324, 326, and 328 respectively. All of the down converted sampled collected signals from the different collectors are carefully merged in unit 354 where the additional information obtained from the parameter estimation units 336, 338, and 340 are used as a guide on how to combine the various collections into one effective multidimensional signal, 356, and one effective parameter estimation file sent on 358, that are ultimately sent to the selected MUD processor 360.

A preferred embodiment of the present invention 300, as shown in FIG. 3 shows 3 collectors (antennae) 312, 314, and 316, that are spatially separated. The analog aggregate received signals 112, 114, and 116 (transmitted as in FIG. 1) are received by each collector 312, 314, and 316 and are passed along lines 318, 320 and 322 to individual receiver front end units 324, 326 and 328. Each of the processing units 324, 326 and 328 operate as processor 204 shown in FIG. 2.

Collector or antenna 312 is connected by line 318 to its own receiver front end unit 324 and its own parameter estimation unit 336 from line 330. The pre-processor 324 outputs a sampled, discrete time signal on line 330. Again, the parameter estimation unit 336 and the signal pre-processor unit 324 are the same units as those shown in FIG. 2 that were previously used with a single collector system.

As shown, three independent collectors, pre-processors, and parameter estimation units are employed for a single MUD unit 360. Additionally, the sorting unit 354 may include a parameter estimation refinement processing procedure that can take advantage of the increased dimensionality, where the same number of parameters must be estimated, but there are, in essence, more equations (more dimensions) that can be used in making the estimates.

Collector 314 outputs the received signal on line 320 to receiver front end 326, similar to 324. Output signal, sampled discrete time signal, proceeds on line 332 to parameter estimation unit 338. The parameter estimation unit 338 has an output on line 344.

Separate independent collector 316 receives the aggregate signal 112, 114, and 116 which is sent on line 322 to the corresponding receiver front end unit 328, also the same unit as units 324 and 326. A sample discrete time signal is outputted on line 334. Parameter estimation unit 340 receives the pre-processed signal from unit 328. The parameter estimation unit 340 is the same as units 336 and 338. Thus the same chain of processors is duplicated for each collector 312, 314 and 316. The result is that for each collector 312, 314 and 316 there is one signal and one set of parameters inputted into a stack measurement and parameter unit (organizational unit) 354 from each collector. Line 342, line 344 and line 346 all input the individual estimation parameters into unit 354 from each collector. Simultaneously line 330, line 332 and line 334 input the individual discrete time signal for each collector into the stack measurements and parameters unit 354. Because the present invention uses three collectors 312, 314 and 316, the stacking unit 354 outputs on line 358 to a single MUD 360 a six-dimensional vector measurement, at every time sample, where there are 2 dimensions associated with each of the three collectors, namely one in phase measurement and one quadrature measurement associated with each collector. Unit 354 combines the separate sets of parameter estimates received from each collector into one set of parameter estimates that are sent to a conventional MUD 360 on line 356 to create one set of parameters that describes, in the same multidimensional space, which is 6 dimensional for this example, the set of individual but interfering signals that have been added by the channel to create the single multidimensional received signal.

The present invention is based on the premise that when creating a signal model using a matrix, S, to represent the received waveforms associated with each user transmitted waveforms, the rank of S determines the number of dimensions or, in other words, the number of orthogonal basis functions that are required to fully represent the individual but interfering signals. It is said that the set of interfering signals spans an x-dimensional space, where x is the rank of the S matrix referred to here. When the model is expanded to include several matrices stacked one upon the other, each due to a different collection site, (collector), the rank of the new, taller, signal matrix is often much higher. In the best case, the rank of the new taller signal matrix is the addition of each of the original S matrices. This is important because as the total number of interfering signals is increased, the rank of any individual S matrix will be significantly smaller than the number of users. This case presents a difficult problem to solve in the MUD which is commonly known by one educated in the state of the basic MUD literature as the complexity problem of the optimal MUD and the inoperability of short cut solutions that rely on S having full rank. Once one or more S matrices are stacked, the new rank is significantly increased, some times even resulting in fewer signals than rank dimension, allowing for very simple short cut MUD algorithms to work well. This stacking is accomplished in the stacking unit 354, which uses the time stamp information and the parameter estimation information to stack the digital received signals into a vector measurement at each time sample.

A primary advantage of this invention is that the MUD multiuser detector unit 360 does not have to be modified or changed at all because it continues to its use an input signal vector from the stacking unit 354, line 356 and the corresponding set of parameter estimates to first define its processing parameters and then to perform the processing. The MUD unit 360 will automatically adapt to having a higher dimensional signal because it has to define it's processing procedure using the S matrix (which is a function of the set of parameter estimates) before it begins processing. The MUD unit 360 will have improved performance due to the increase in total number of signal dimensions while the total number of transmitted signals making up the received signal remains the same. The multiuser detector 360 outputs a symbol stream for each user over line 362.

The advantage of the present invention can be easily seen in a cellular telephone system or in a data storage/recovery system. The invention improves upon any multiuser detection procedure that is capable of pulling apart signals in heavy interference in real time. One improvement will be that any given multiuser detector that has good performance in a given interference ridden scenario could be replaced by a lower complexity, multiuser detector that takes short cuts in the detection algorithm relative to the optimal MAP (maximum aposteriori) or ML (maximum likelihood) exhaustive search algorithm by combining the signal received from two or more spatially separated receiver ports. In a different scenario, another and different improvement could be that the total number of users packed into a given channel can be increased relative to any currently deemed satisfactory system of interfering users and multiple user receivers if this invention is employed at the receiver.

One of the primary advantages of the invention is the fact that the components used in this invention have been used in single collector systems. In the present invention from a cost-effective standpoint, the system efficiency is greatly increased by the addition of additional collectors with the same pre-processing components and parameter estimation components.

Using the present invention a multiuser receiver system can be used to allow for channel assignment reuse of commercial wireless communications or higher packing of information on magnetic or optical storage/recovery systems, double, triple and possibly quadruple the number of active users in a cell or sharing the same transmission medium relative to what is possible with the prior state of the art. This implementation requires only a new processing unit in the base station receiver, modem or gateway controller. The improvement would only add another port or antenna to the collection part of the receiver. With respect to cellular telephones, each user cellular telephone could get an additional one or more antennas and pre-processing and parameter estimation components.

It will be seen that the objects set forth above and those made apparent from the forgoing description are efficiently attained and since certain changes may be made in the above construction without departing from the scope of the invention, it is intended that all matters contained in the foregoing description are shown in the accompanying drawings shall be interpreted as illustrative and not in a limiting sense.

The present invention can be realized in hardware, software, or a combination of hardware and software. Any kind of computer system—or other apparatus adapted for carrying out the methods described herein—is suited.

The present invention can also be embedded in a computer program product, which comprises all the features enabling the implementation of the methods described herein, and which—when loaded in a computer system or processor device—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

It is also to be understood that the following claims are intended to cover all of the generic and specific features of the invention herein described and all statements of the scope of the invention, which as a matter of language, might be said to fall there between.

What is claimed is:

1. A method for increasing overall throughput of a multiple access system, said system comprised of at least one transmitter for transmitting data signals using a single channel, and at least one corresponding receiver, the method comprising the steps of:
   receiving signals through at least two independent signal collectors for each receiver;
   processing each signal received by each signal receiving collector through a separate preprocessing unit including analog to digital signal conversion, each separate preprocessing unit providing processed digital signals from one of the collectors;
   connecting an separate parameter estimation unit to the output of each preprocessing unit to receive processed digital signals from one of the collectors;
   connecting an organizational unit accepting signal inputs from each of the parameter estimation units and processed digital signals from each of the preprocessing units;
   stacking said signals received from each of said parameter estimation units via the organizational unit into a vector measurement at each time sample;
   combining separate sets of parameter estimates received from each of said parameter estimation units into a single set in said organizational unit;
   transmitting said single set of parameters to a multiuser detection unit;
   outputting a symbol stream for each user from said multiuser detection unit; and
   using the following to stack the digital received signals into vector measurements at each time sample: time stamp information from each independent signal receiving collector's preprocessed signal.

2. A receiver for use in a digital communication system that includes a multiple user detector for separating signals that interfere from a first user transmitter and a second user transmitter in order to increase overall throughput and to increase the number of interfering users in a MUD system comprising:
   a first signal collector for collecting simultaneously first interfering signals from said first and second user transmitters, a first preprocessing unit for processing said received first interfering signals connected to the output of said first signal collector, and a first parameter estimating unit for generating first parameter estimate signal connected to the output of said first collector preprocessing unit;
   a second signal collector for collecting simultaneously second interfering signals from said first and second user transmitters physically separated from said first collector and independent of said first signal collector, a second signal processor for processing said received second interfering signals and a second signal parameter estimation unit for generating second parameter estimate signals; and
   organizing means connunicatively coupled to both outputs of said first collector preprocessor and said first collector parameter estimating unit and both outputs of said second signal preprocessing unit and said second collector parameter estimation unit, said organizing unit comprising a means for stacking each of said parameter estimate signals based on a time stamp of each of said parameter estimate signals for generating a desired set of parameter estimating signals acceptable to said multiuser detector.

3. A system for digital communications comprising:
   at least two transmitters operating on the same channel; and
   at least one receiver, said receiver comprising:
   at least two independent signal collectors for collecting user transmitted signals;
   at least two separate signal preprocessing units, each said signal preprocessing unit communicatively coupled to an output of a different one of said independent signal collectors;
   at least two separate parameter estimating units, each said parameter estimating unit communicatively coupled to an output of one of said signal preprocessing units, wherein each parameter estimation unit is coupled to a different preprocessing unit;
   an organizing unit communicatively coupled to the output of each said parameter estimation unit and each said preprocessing unit, said organizing unit comprising a stacking device for stacking measurements and combining parameters between each of said parameter estimation units; and
   a multiuser detecting unit communicatively coupled to an output of said organizing unit for receiving a multidimensional signal corresponding to said at least two transmitters where the multiuser detection procedure is defined, in part, from parameter estimates and time stamps provided by said at least two parameter estimation units and said at least two preprocessing units, wherein the time stamps include a time stamping of the incoming signals.

4. The system of claim 3 wherein each said preprocessing unit comprises:
   at least one front end filter for minimizing signals that are outside the band of interest;
   at least one down converter for converting the received signal to a lower frequency; and
   at least one analog to digital converter for sampling the received signals.

5. The system of claim 3, wherein each preprocessing unit outputs a discrete time sampled signal and provides it to said organizational unit.

6. The system of claim 3, wherein said preprocessing unit for each said independent signal receiving collector is the same type.

7. The system of claim 3, wherein each said parameter estimation unit for each said independent signal receiving collector is the same type.

8. The system of claim 3 wherein each said parameter estimation unit calculates signals from each said collector signal including at least one parameter for each signal from: a time stamp, a symbol timing offset relative to an internal clock, carrier phase offset relative to an internal oscillator at the receiver, a frequency offset or Doppler, and a multipath structure of the channel.

9. The system of claim 3 further comprising:

means for including at least two matrices based on signals received from each signal collector, each due to a different collection site of each said collector, stacked upon each other to create a new signal matrix; the rank of said new signal matrix being used to provide improved effective dimensions of wave forms that make up the received signal provided to said multiuser detector for processing.

10. A digital communication system that includes a multiple user detector for separating signals that interfere from a first user transmitter and a second user transmitter in order to increase overall throughput and to increase the number of interfering users in a MUD system comprising:

at least two transmitters operating on the same channel; and
at least one receiver, said receiver comprising:
a first signal collector, a first signal preprocessing unit connected to an output of said first signal collector and a first parameter estimating unit connected to an output of said first signal preprocessing unit;
a second signal collector independent of said first signal collector, a second signal preprocessing unit connected to an output of said second signal collector and a second signal parameter estimation unit connected to an output of said second signal preprocessing unit; and
organizing means communicatively coupled to both outputs of said first preprocessing unit and said first parameter estimating unit and both outputs of said second preprocessing unit and said second parameter estimation unit, said organizing unit comprising a means for stacking said received signals based on a time stamp of said signals and a set of parameters corresponding to each of the transmitted signals as received at each of the signal collectors.

11. A digital communication as in claim 10, further comprising:

means for including at least two matrices based on signals received from said first collector and said second collector, stacked upon each other, each due to a different collection site of said first collector and said second collector; the rank of said new signal matrix being used to provide improved effective dimensions of the space spanned by the wave forms received by each transmitter separately which comprise the actual received signal that is provided to said MUD for processing.

* * * * *